United States Patent
Sakabe et al.

(10) Patent No.: US 6,841,729 B2
(45) Date of Patent: Jan. 11, 2005

(54) SELF-SUPPORTING CABLE AND MANUFACTURING METHOD THEREFOR

(75) Inventors: Itaru Sakabe, Yokohama (JP); Hiroki Ishikawa, Yokohama (JP); Nobuhiro Akasaka, Yokohama (JP); Takeo Tsurumi, Yokohama (JP); Yoshiro Yamane, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 94 days.

(21) Appl. No.: 09/971,695

(22) Filed: Oct. 9, 2001

(65) Prior Publication Data

US 2002/0062978 A1 May 30, 2002

(30) Foreign Application Priority Data

Oct. 13, 2000 (JP) ........................................ 2000-313865

(51) Int. Cl.$^7$ ............................................... H01B 7/00
(52) U.S. Cl. .................. 174/41; 174/110 R; 174/113 R
(58) Field of Search ............................... 174/36, 110 R, 174/113 R, 119 C, 120 R, 120 AR, 120 SR, 121 R, 121 A, 121 SR; 385/100, 101, 102, 103, 104, 105, 106, 107, 108, 109, 110, 111, 112, 113

(56) References Cited

U.S. PATENT DOCUMENTS

| | | | | |
|---|---|---|---|---|
| 4,389,087 A | * | 6/1983 | Bendayan et al. | ........... 385/102 |
| 5,043,037 A | * | 8/1991 | Buckland | ..................... 156/166 |
| 5,082,348 A | * | 1/1992 | Gartside et al. | ............. 385/111 |
| 5,448,670 A | * | 9/1995 | Blew et al. | .................. 385/112 |
| 5,905,834 A | * | 5/1999 | Anderson et al. | ........... 385/111 |
| 6,054,070 A | * | 4/2000 | Tokairin et al. | ........... 264/1.28 |
| 6,101,305 A | * | 8/2000 | Wagman et al. | ............. 385/113 |
| 6,160,939 A | * | 12/2000 | Sheu | .......................... 385/109 |
| 6,188,821 B1 | * | 2/2001 | McAlpine et al. | ........... 385/100 |
| 6,192,178 B1 | * | 2/2001 | Logan et al. | ................ 385/109 |
| 6,229,944 B1 | | 5/2001 | Yokokawa et al. | |
| 6,236,790 B1 | * | 5/2001 | Okada et al. | ................ 385/102 |
| 6,249,628 B1 | * | 6/2001 | Rutterman et al. | ......... 385/106 |
| 6,259,844 B1 | * | 7/2001 | Logan et al. | ................ 385/113 |
| 6,356,690 B1 | * | 3/2002 | McAlpine et al. | ........... 385/109 |
| 6,370,303 B1 | * | 4/2002 | Fitz et al. | .................... 385/113 |
| 6,377,738 B1 | * | 4/2002 | Anderson et al. | ........... 385/113 |
| 6,529,662 B1 | * | 3/2003 | Kobayashi et al. | ......... 385/112 |
| 6,546,175 B1 | * | 4/2003 | Wagman et al. | ............. 385/113 |

FOREIGN PATENT DOCUMENTS

| | | | | |
|---|---|---|---|---|
| EP | 1 041 421 A1 | * | 10/2000 | ............ G02B/6/44 |
| JP | 08/110449 A | * | 4/1996 | ............ G02B/6/44 |
| JP | 10-115755 A | * | 5/1998 | ............ G02B/6/44 |
| JP | 2001-343571 | * | 12/2001 | ............ G02B/6/44 |

OTHER PUBLICATIONS

U.S. patent application No. 09/556,684, filed Apr. 21, 2000, Tomoyuki Yokokawa, et al, "*Optical Fiber Cable*".

* cited by examiner

Primary Examiner—William H. Mayo, III
(74) Attorney, Agent, or Firm—McDermott Will & Emery LLP

(57) ABSTRACT

A self-supporting cable includes a main cable constructed by covering a cable core with an inner cover layer and installing one or more strength members inside the inner cover layer such that they lie on a plane passing through the central axis thereof; a support member; and an outer cover layer formed so as to cover the main cable and the support member while they are arranged in parallel. A support member portion including the support member and a part of the outer cover layer and a main cable portion including the main cable and a part of the outer cover layer are connected by connecting portions, which are also a part of the outer cover layer, in the longitudinal direction thereof. The main cable portion is made longer than the support member portion so that there is an allowance in the length thereof.

8 Claims, 5 Drawing Sheets

SELF-SUPPORTING CABLE AND MANUFACTURING METHOD THEREFOR

BACKGROUND OF THE INVENTION

1. Field of the Invention

The present invention relates to a self-supporting cable which is installed overhead and is used as a subscriber line, and also relates to a method for manufacturing the self-supporting cable.

2. Description of the Background Art

Self-supporting cables having a construction as shown in FIGS. 8A to 8C have been suggested as optical fiber cables to be installed overhead for subscriber lines in optical communications networks. FIGS. 8A and 8B show an example of such a conventional self-supporting cable, wherein FIG. 8A is a perspective view thereof and FIG. 8B is a cross-sectional view thereof. FIG. 8C is a cross-sectional view of a cable core used in the self-supporting cable. In FIGS. 8A to 8C, reference numeral 41 denotes optical fiber ribbons, 41a denotes optical fibers, 41b denotes optical fiber coatings, 41c denotes coated optical fibers, 41d denotes ribbon coatings, 42 denotes a cable core, 43 denotes a support member, 44 denotes strength members, 45 denotes an outer cover layer, 46 denotes supporting portion, 47 denotes connecting portions, 48 denotes a main cable portion, and 49 denotes window portions.

The coated optical fibers 41c are constructed by applying the optical fiber coatings 41b on the optical fibers 41a, and the optical fiber ribbons 41 are constructed by arranging a plurality of coated optical fibers 41c in parallel and applying the ribbon coating 41d thereover. The cable core 42 is constructed by stacking a plurality of optical fiber ribbons 41. The stack of optical fiber ribbons may be wound by a tape or a string so as to maintain the stack. In addition, such stack may also be twisted in the longitudinal direction thereof.

The cable core 42, the support member 43, and two strength members 44 are arranged in parallel to each other in the longitudinal direction, and the outer cover layer 45 is formed by extruding a thermoplastic resin by using an extruder such that it has a cross-section of figure-8 shape so as to cover these members. The support member 43 is formed of stranded steel wires, FRP, etc., and the strength members 44 are formed of a steel wire, etc. To improve the flexibility of the self-supporting cable, the support member 43 and the strength members 44 are arranged such that the central axis thereof are on the same plane. The support member 43 serves to support the self-supporting cable when it is installed overhead. In addition, the strength members 44 serve to prevent the outer cover layer 45 from shrinking as the internal strain generated during the extrusion process reduces over time.

In the above-described self-supporting cable, the cable core 42 is constructed such that there is an excess length therein, so that, even when the self-supporting cable is installed overhead and tension is applied thereto, the cable core 42 is not subject to the tension. The supporting portion 46 includes the support member 43 and a part of the outer cover layer 45 around the support member 43, and the main cable portion 48 includes the cable core 42 and a part of the outer cover layer 45 around the cable core 42. The connecting portions 47, which are also a part of the figure-8 shaped outer cover layer 45, connect the supporting portion 46 and the main cable portion 48 with intervals in the longitudinal direction.

The connecting portions 47 are formed by intermittently removing portions of the connecting portion, which was continuous in the longitudinal direction upon the formation of the outer cover layer 45, by using an automatic cutter, such that the window portions 49 are formed between the connecting portions 47.

In the process of forming the outer cover layer 45, the feed rate at which the cable core 42 is fed to a crosshead of the extruder is set higher than the feed rate at which the support member 43 is fed thereto. Thus, the main cable portion 48 is made longer than the supporting portion 46 so there is an allowance in the length thereof. Since the feed rate of the cable core 42 and that of the support member 43 different, the resin forming the outer cover layer 45 is subject to an unbalanced strain in the extrusion process.

Accordingly, it is difficult to form the outer cover layer 45 so that it has a smooth figure-8 shape. In particular, when a clearance is provided between the cable core 42 and the outer cover layer 45 in the main cable portion 48, the outer cover layer 45 may not have a concentric shape around the cable core 42; the outer cover layer 45 may be deformed as though it is compressed.

FIG. 9 is a cross-sectional view which shows an example in which a clearance is provided between the cable core 42 and an outer cover layer 45' in a main cable portion 48'. As shown in FIG. 9, in the main cable portion 48', the outer cover layer 45' does not have a concentric shape and inward protrusions are formed on the inner wall thereof at positions close to the strength members 44. When the outer cover layer 45' is thus deformed, the protrusions formed on the inner walls may abut against and press the cable core 42. Thus, transmission characteristics of optical fibers contained in the core cable 42 may be degraded.

SUMMARY OF THE INVENTION

Accordingly, in order to solve the above-described technical problems, an object of the present invention is to provide a self-supporting cable in which deformation of the outer cover layer is prevented and harmful influence on the cable core is avoided, and to provide a method for manufacturing the self-supporting cable.

According to an embodiment of the present invention, a self-supporting cable includes a main cable constructed by covering a cable core with an inner cover layer, which is formed of a thermoplastic resin and which has a tubular shape, and installing one or more strength members inside the thermoplastic resin of the inner cover layer such that the strength members lie on a plane passing through the central axis of the inner cover layer; a support member; and an outer cover layer which is formed of a thermoplastic resin and which has a figure-8 shape in cross-section, and which is formed so as to cover the main cable and the support member while the main cable and the support member are arranged in parallel to each other. A support member portion, which includes the support member and a part of the outer cover layer around the support member, and a main cable portion, which includes the main cable and a part of the outer cover layer around the main cable, are connected together with connecting portions, which are also a part of the outer cover layer, with intervals in the longitudinal direction. The main cable portion is made longer than the support member portion so that there is an allowance in the length thereof.

Thus, according to the present invention, the main cable is covered in advance by a concentric inner cover layer, which does not have a vertically asymmetric shape such as a figure-8 shape, etc. Accordingly, the inner cover layer is easily prevented from being deformed and protruding inward as in the conventional type. In addition, when the outer cover layer is formed in the extrusion process, no clearance is provided between the outer cover layer and the inner cover layer. Since the outer cover layer comes into contact with the inner cover layer, the outer cover layer is also prevented from being deformed and protruding inward. Accordingly, the cable core disposed inside the inner cover layer does not receive local pressure.

In addition, since one or more strength members are installed in the inner cover layer, the shrinkage of the inner cover layer can be prevented. Furthermore, when the strength members are arranged on a plane passing through the central axes of the main cable and the support member, flexibility of the self-supporting cable can be increased.

In addition, a method for manufacturing a self-supporting cable according to the present invention includes the steps of arranging a main cable, which includes a cable core and one or more strength members which are disposed at positions on a plane passing through the central axis of the main cable and which are apart from the central axis of the main cable, and a support member in parallel to each other; and forming an outer cover layer so as to cover the main cable and the support member by extruding a thermoplastic resin in a crosshead of an extruder. The main cable is led to the crosshead of the extruder after being bent by a first roller which is disposed upstream of the crosshead, the first roller having a rotational axis which is parallel to a plane passing through the central axis of the support member and the central axis of the main cable in the crosshead of the extruder and is perpendicular to the moving direction of the main cable. Accordingly, even in the case where a main cable having the strength members disposed therein is produced in advance, the self-supporting cable in which the support member and the strength members are arranged on the same plane can be manufactured.

BRIEF DESCRIPTION OF THE DRAWINGS

FIGS. 1A and 1B show a self-supporting cable according to an embodiment of the present invention, wherein FIG. 1A is a perspective view thereof and FIG. 1B is a sectional view thereof.

FIGS. 4A and 4B show an important part of an apparatus of manufacturing a self-supporting cable according to the present invention, wherein FIG. 4A is a side view thereof and FIG. 4B is an top view thereof;

FIGS. 5A and 5B show a roller used in the apparatus of manufacturing the self-supporting cable, wherein FIG. 5A is a top view thereof, and FIG. 5B is a sectional view of FIG. 5A cut along line Y–Y';

FIGS. 6A and 6B are top views which show examples in which a plurality of rollers are used, wherein FIG. 6A shows an example in which two rollers are used and FIG. 6B shows an example in which four rollers are used;

FIGS. 8A and 8C show an example of a conventional self-supporting cable, wherein FIG. 8A is a perspective view thereof and FIG. 8B is a sectional view thereof, and FIG. 8C is a sectional view of a cable core contained in the self-supporting cable.

DETAILED DESCRIPTION OF THE INVENTION

The present invention will be further illustrated in the following descriptions.

Figure 1A:
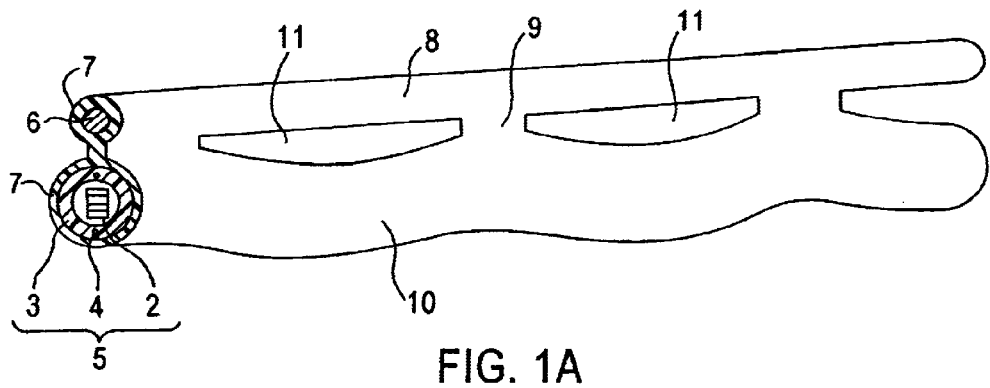
Figure 1B:
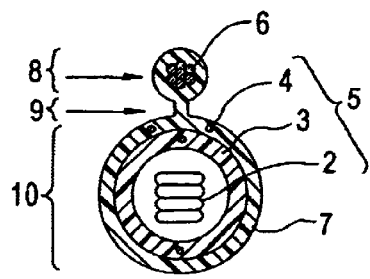
Figure 1C:
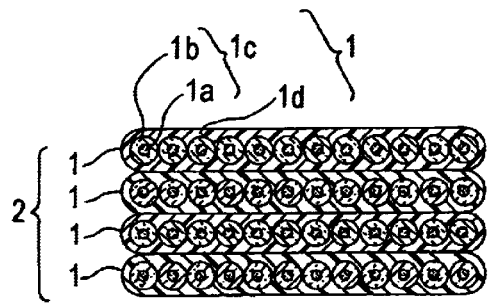
FIG. 1C is a sectional view of a cable core contained in the self-supporting cable.

FIGS. 1A and 1B show a self-supporting cable according to an embodiment of the present invention, wherein FIG. 1A is a perspective view thereof and FIG. 1B is a sectional view thereof, and FIG. 1C is a sectional view of a cable core contained in the self-supporting cable. In FIGS. 1A to 1C, reference numeral 1 denotes optical fiber ribbons, 1$a$ denotes optical fibers, 1$b$ denotes optical fiber coatings, 1$c$ denotes coated optical fibers, 1$d$ denotes ribbon coatings, 2 denotes a cable core, 3 denotes an inner cover layer, 4 denotes strength members, 5 denotes a main cable, 6 denotes a support member, 7 denotes an outer cover layer, 8 denotes a supporting portion, 9 denotes connecting portions, 10 denotes a main cable portion, and 11 denotes window portions.

The coated optical fibers 1$c$ are constructed by applying the optical fiber coatings 1$b$ on the optical fibers 1$a$, and the optical fiber ribbons 1 are constructed by arranging a plurality of coated optical fibers 1$c$ in parallel and applying the ribbon coatings 1$d$ thereover. There are various types of optical fiber ribbons 1 which may include from two to sixteen coated optical fibers 1$c$. The cable core 2 is constructed by stacking a plurality of optical fiber ribbons 1. This stack may be wound by a tape or a string so as to maintain the stack. In addition, the stack may also be twisted in the longitudinal direction thereof with a pitch of about 200 mm to 700 mm.

Then, the main cable 5 is constructed by covering the cable core 2 with the inner cover layer 3. A clearance may be provided between the cable core 2 and the inner cover layer 3 so that the cable core 2 can be meandered inside the inner cover layer 3. The inner cover layer 3 is formed by extruding a thermoplastic resin such as polyethylene, etc., so as to cover the cable core 2. One or more strength members 4, which are formed of steel wires, etc., are embedded inside the inner cover layer 3. The strength members 4 serve to prevent shrinkage of the inner cover layer 3 as the internal strain generated during the extrusion process reduces over time. To improve the flexibility, in the case in which a plurality of strength members 4 are embedded inside the inner cover layer 3, all of the strength members 4 are arranged on a plane which passes through the central axis of the main cable 5.

Figure 8A:
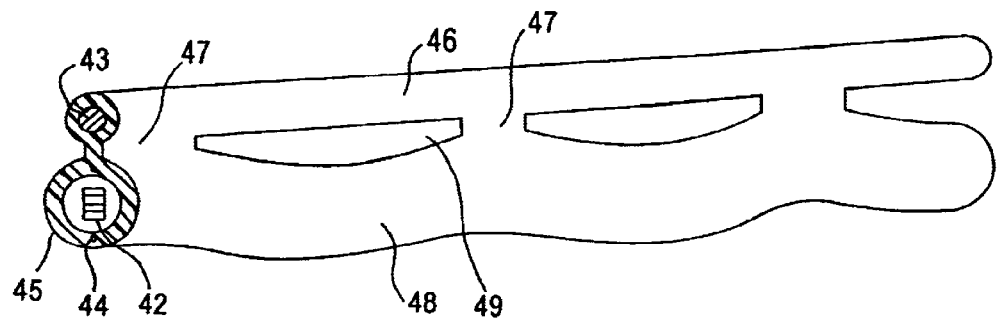
Figure 8B:
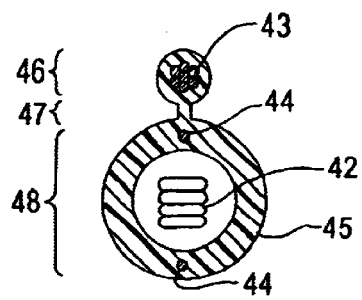
Figure 8C:
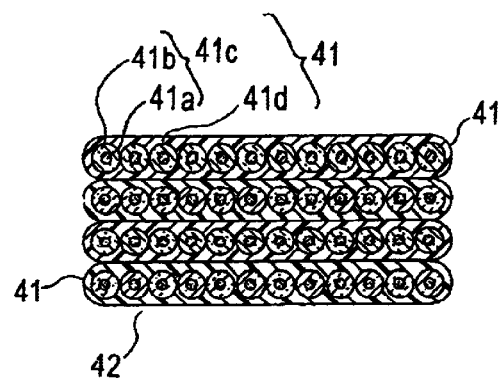
Figure 9:
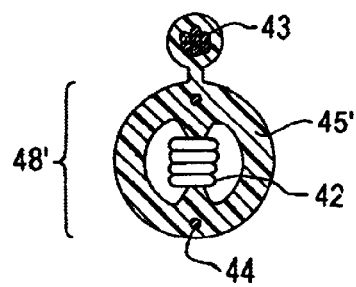
FIG. 9 is a sectional view showing an example in which an inner surface of an outer cover layer of a conventional self-supporting cable is deformed and protrusions are formed therein.

Then, the main cable 5 and the support member 6 are arranged in parallel, and are covered by the outer cover layer 7 which is formed of a thermoplastic resin and has a figure-8 shape. The support member 6 is formed of stranded steel wires, FRP, etc. The supporting portion 8 includes the support member 6 and a part of the outer cover layer 7 around the support member 6, and the main cable portion 10 includes the main cable 5 and a part of the outer cover layer 7 around the main cable 5. The connecting portions 9, which are also a part of the figure-8 shaped outer cover layer 7, connect the supporting portion 8 and the main cable portion 10 with intervals in the longitudinal direction.

The connecting portions 9 are formed by intermittently removing portions of the connecting portion, which was continuous in the longitudinal direction upon the formation of the outer cover layer 7, using an automatic cutter, such that the window portions 11 are formed between the connecting portions 9.

In addition, in the process of forming the outer cover layer 7, a feed rate at which the main cable 5 is fed to a crosshead of an extruder is made higher than a feed rate at which the support member 6 is fed thereto. Thus, the main cable portion 10 is made longer than the supporting portion 8 so that there is an allowance in the length of the main cable portion 10.

In order to make the main cable portion 10 longer than the supporting portion 8, the main cable 5 moves at greater speed than the support member 6 in the crosshead. Accordingly, the outer cover layer 7 receives an unbalanced force due to the speed difference. However, since the main cable 5 is covered by the inner cover layer 3 in advance and a clearance is not provided between the inner cover layer 3 and the outer cover layer 7, inward deformation and protrusion of the inner wall of the outer cover layer 7 are prevented.

In addition, in the case in which the support member 6 and the strength members 4 are arranged on the same plane, flexibility of the self-supporting cable can be improved. Thus, the strength members 4 are preferably arranged on the plane which passes through the central axes of the support member 6 and the main cable 5. In such a case, when the self-supporting cable is wound around a drum and is thereby bent, the support member 6 and the strength members 4 are arranged in parallel to the barrel surface of the drum. Thus, when the self-supporting cable is bent, the support member 6 and the strength members 4 are disposed in a neutral region, and are prevented from being stretched. Accordingly, the self-supporting cable can be wound around a drum having a relatively small diameter.

If the main cable 5 is not controlled in the process of manufacturing the self-supporting cable, the strength members 4 may be displaced from the plane passing through the central axes of the support member 6 and the main cable 5. Thus, the main cable 5 is controlled before it is fed to the crosshead of the extruder by a method which will be described below.

A resin having a relatively high Young's modulus such as HDPE, etc., is used as the thermoplastic resin for forming the inner cover layer 3, and a resin having a relatively low Young's modulus is used as the thermoplastic resin for forming the outer cover layer 7. In such a case, the main cable 5 becomes relatively rigid, and less deformation of the inner cover layer 3 along with the outer cover layer 7 occurs in the extrusion process for forming the outer cover layer 7.

In the extrusion process for forming the outer cover layer 7, the main cable 5 moves with greater speed than the support member 6 and hence the speed of the resin forming the outer cover layer 7 is not uniform over the cross section of the cable.

Such an extrusion process becomes relatively easy to perform when the resin forming the outer cover layer 7 is relatively soft.

Figure 2:
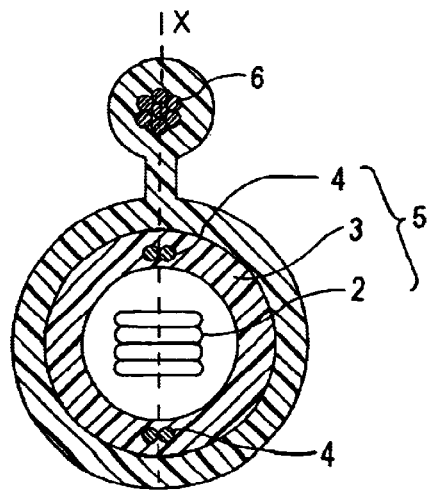
FIG. 2 is a sectional view of an example of a self-supporting cable which includes four strength members.

Although two strength members 4 are embedded in the inner cover layer 3 shown in FIGS. 1A and 1B, there may also be a case in which four strength members 4 are embedded. FIG. 2 shows a self-supporting cable including four strength members 4, and the same reference numerals denote the same components as those shown in FIGS. 1A and 1B. Since four strength members 4 are provided, they are divided into two pairs, and two strength members 4 of each pair are arranged such that they come into contact with each other on the X–X' plane, which passes through the central axes of the support member 6. Also in this case, it is assumed that the strength members 4 are on the X–X' plane which passes through the central axes of the support member 6 and the main cable 5. In addition, there may also be a case in which only one strength member 4 is included in the self-supporting cable. In such a case, the strength member 4, of course, is disposed at the position away from the center of the main cable 5 and on the plane which passes through the central axes of the support member 6 and the main cable 5.

Figure 3:
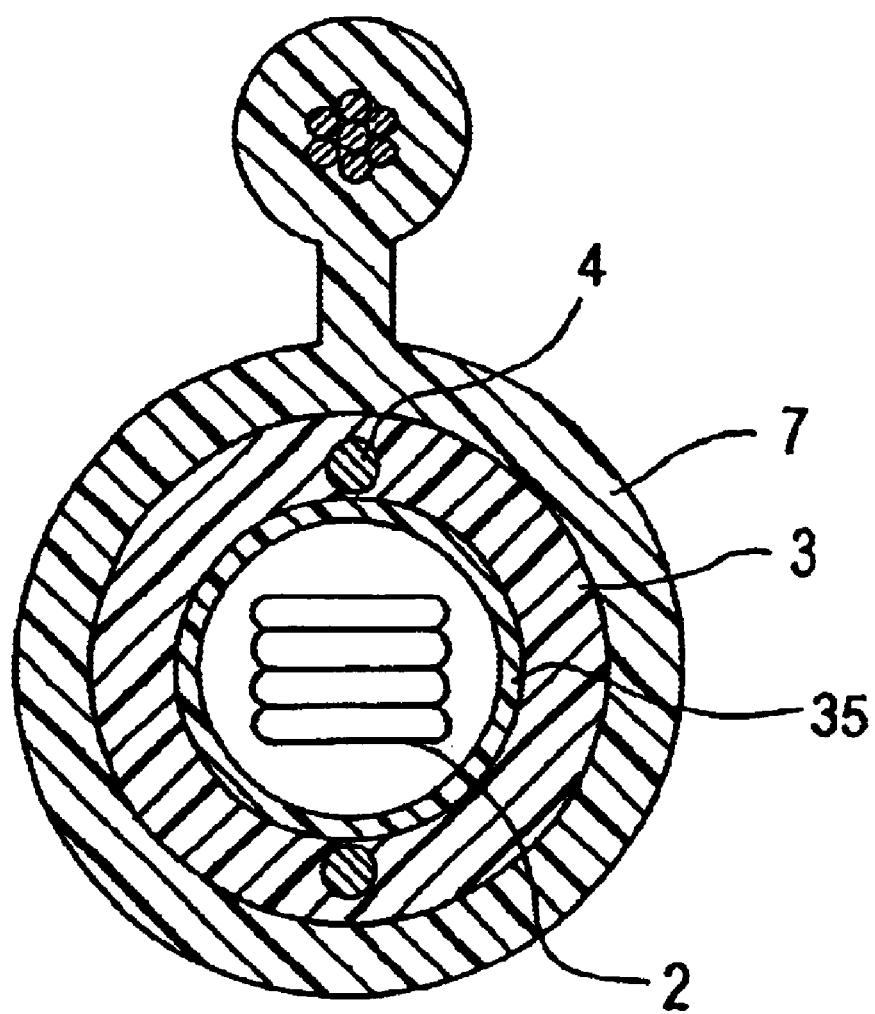
FIG. 3 is a sectional view of a self-supporting cable according to another embodiment of the present invention.

FIG. 3 shows a self-supporting cable according to another embodiment of the present invention.

According to the present embodiment, the inner cover layer (3, 35) has a double-layer structure. Since the inner cover layer (3, 35) has a double-layer structure, deformation of the inner wall and formation of protrusions can be more reliably prevented. Even when the strength members 4 are embedded in only one of the two layers forming the inner cover layer, shrinkage of the inner cover layer 3 can be prevented if the double-layer structure thereof is constructed by tandem extrusion.

Figure 4A:
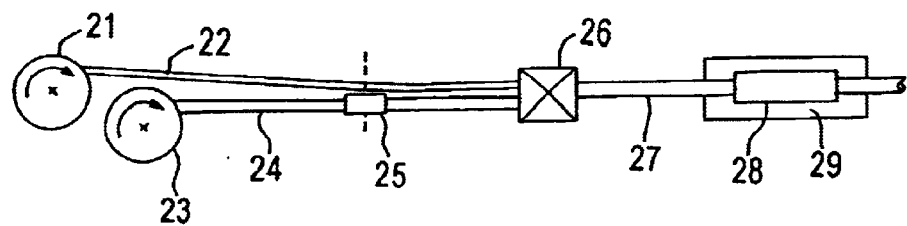
Figure 4B:
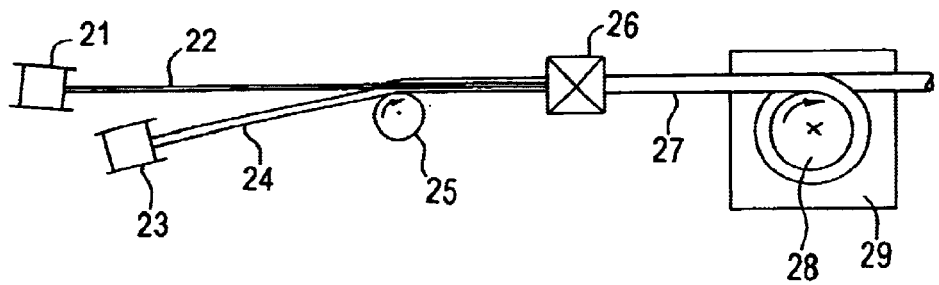

Next, a method for manufacturing a self-supporting cable according to the present invention will be described. FIGS. 4A and 4B show an important part of an apparatus of manufacturing a self-supporting cable, wherein FIG. 4A is a side view thereof and FIG. 4B is an top view thereof. In FIGS. 4A and 4B, reference numeral 21 denotes a support member feed reel, 22 denotes a support member, 23 denotes a main cable feed reel, 24 denotes a main cable, 25 denotes a roller, 26 denotes a crosshead, 27 denotes a self-supporting cable, 28 denotes a roller, and 29 denotes a water tank.

The support member 22 is fed from the support member feed reel 21 and is led to the crosshead 26. The main cable 24 is fed from the main cable feed reel 23, is bent by the roller 25 so that the direction thereof is changed, and is led to the crosshead 26. The support member 22 and the main cable 24 pass through the crosshead 26 together in such a manner that the support member 22 is positioned above the main cable 24 in a parallel manner. Accordingly, in the crosshead 26, the central axes of the support member 22 and the main cable 24 are arranged on a vertical plane.

In one aspect of the method of manufacturing the self-supporting cable according to the present invention, the roller 25 is disposed upstream of the crosshead 26, and the main cable 24 is led to the crosshead 26 after it is bent by the roller 25. The roller 25 is disposed such that the rotational axis thereof is parallel to the plane which passes through the central axes of the main cable 24 and the support member 22 in the crosshead 26 and perpendicular to the moving direction of the main cable 24. Accordingly, in FIGS. 4A and 4B, the rotational axis of the roller 25 extends in the vertical direction.

Figure 5A:
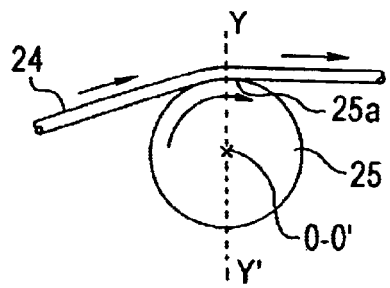
Figure 5B:
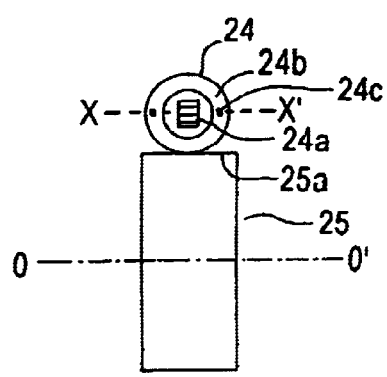

A description of the operation of the roller 25 is given. FIGS. 5A and 5B show the roller 25 and the main cable 24, wherein FIG. 5A is an top view thereof and FIG. 5B is a cross-sectional view of FIG. 5A cut along line Y–Y'. In FIGS. 5A and 5B, reference numeral 24 denotes the main cable, 24a denotes a cable core, 24b denotes an inner cover layer, 24c denotes strength members, 25 denotes the roller, 25a denotes a roller surface, O–O' denotes the rotational axis of the roller 25, and X–X' denotes a plane which passes through the central axis of the main cable 24, and on which the strength members 24c are arranged.

The main cable 24 is constructed by covering the cable core 24a with the inner cover layer 24b having a tubular shape and embedding the strength members 24c in a resin of which the inner cover layer 24b is formed. The strength members 24c are arranged on the plane X–X' which passes through the central axis of the main cable 24. The main cable 24 comes into contact with the roller surface 25a of the roller 25 and is bent by the roller surface 25a. When the main cable 24 is bent by the roller surface 25a, a part of the main cable 24 distanced from the roller 25 is extended in the longitudinal direction, and a part of the main cable 24 proximate to the roller 25 is shrunk in the longitudinal direction. The central part of the main cable 24 is a neutral region of extension and shrinkage, and does not extend or shrink.

The strength members 24c included in the main cable 24 have a higher Young's modulus than the other parts, and extends and shrinks only minimally. Accordingly, the main cable 24 is naturally twisted such that the strength members 24c are disposed in the central region of the main cable 24 between the farthest part and the closest part relative to the roller 25, that is, the neutral region of the extension and shrinkage. More specifically, the main cable 24 is twisted by the roller 25 such that the plane X–X', on which the strength members 24c are arranged, becomes parallel to the rotational axis O–O' of the roller 25, irrespective of the positions at which the strength members 24c are disposed immediately before the main cable 24 reaches the roller 25.

Since the rotational axis O–O' extends in the vertical direction as described above, the strength members 24c in the main cable 24 are arranged in the vertical direction by the time the main cable 24 leaves the roller 25. The roller 25 is not rotated by any driving devices, but rotates naturally by contacting the main cable 24.

As described above, the main cable 24 is bent by the roller 25, and is then led to the crosshead 26. By the time the main cable 24 reaches the crosshead 26, the plane on which the strength members 24c are arranged becomes vertical, and the plane which passes through the central axes of the support member 22 and the main cable 24 also becomes vertical. Thus, in the crosshead 26 and in the self-supporting cable 27 constructed by the crosshead 26, all of the central axis of the support member 22, the central axis of the main cable 24, and the strength members 24c are arranged on the same plane. Accordingly, when the self-supporting cable 27 is wound around a drum, the plane on which the support member 22 and the strength members 24c are arranged becomes parallel to the barrel surface of the drum. Thus, the self-supporting cable 27 can be wound around a drum having a relatively small core diameter.

As shown in FIGS. 4A and 4B, after the self-supporting cable 27 is constructed by covering the support member 22 and the main cable 24 with an outer cover layer having a figure-8 shape in the crosshead 26, it is led to the water tank 29 in which the extruded resin is cooled and cured. While the self-supporting cable 27 is cooled in the water tank 29, it may be wound around the roller 28 which has a rotational axis parallel to that of the roller 25. In such a case, the support member 22 and the strength members 24c are more reliably disposed on the same plane. In addition, while the self-supporting cable 27 is cooled, portions of the outer cover layer having the figure-8 shape can be removed by using an automatic cutter so that window portions are formed therein. The roller 28 may be constructed such that the diameter of a part at which the support member portion is wound and the diameter of a part at which the main cable portion is wound are different.

In such a case, a self-supporting cable can be manufactured such that the main cable portion is made longer than the support member portion so that there is an allowance in the length thereof.

Figure 6A:
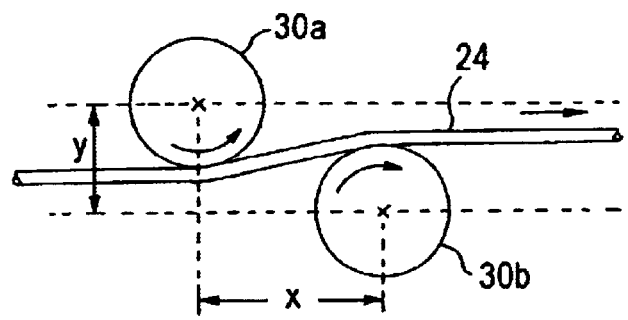
Figure 6B:
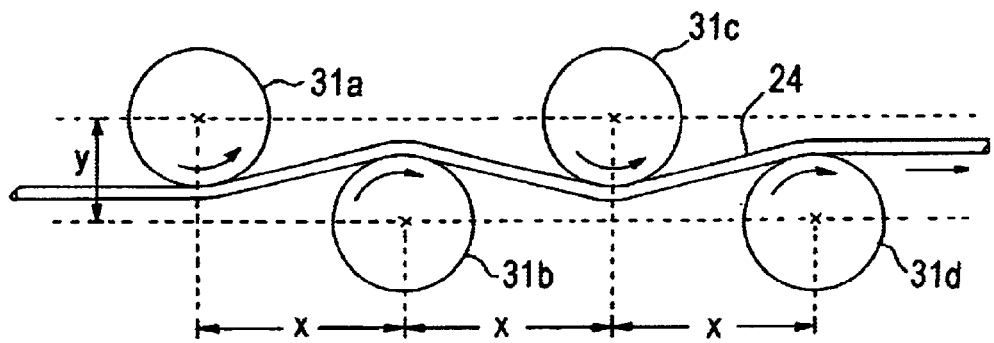

Although only one roller 25 for bending the main cable 24 is disposed upstream of the crosshead 26 in FIGS. 4A and 4B, a plurality of rollers may also be provided for bending the main cable 24 and correcting the positions of the strength members 24c. FIGS. 6A and 6B are top views which show examples in which a plurality of rollers are used, wherein FIG. 6A shows an example in which two rollers are used, and FIG. 6B shows an example in which four rollers are used. In FIGS. 6A and 6B, reference numerals 30a, 30b, 31a, 31b, 31c, and 31d denote rollers, and all the rollers have rotational axes which extend in the vertical direction.

In FIG. 6A, two rollers 30a and 30b are arranged across the main cable 24 along the moving direction of the main cable. The main cable 24 is bent by the rollers 30a and 30b because it is disposed therebetween. In FIG. 6B, four rollers 31a, 31b, 31c, and 31d are arranged across the main cable 24 in a zigzag manner along the moving direction of the main cable 24.

An interval x between the centers of the rollers in the moving direction of the main cable 24 and an interval y between the centers of the rollers in the direction perpendicular to the moving direction of the main cable 24 are determined such that the moving direction of the main cable 24 is slightly changed. In both cases, the main cable 24 is bent in alternately opposite directions by the rollers.

However, since the position of the neutral region in terms of elongation and contraction due to bending remains unaltered, the positions of the strength members are always corrected such that they are arranged along the rotational axis of the rollers, that is, in the vertical direction.

In the example of a self-supporting cable according to the present invention which is described above with reference to FIG. 1, the main cable was constructed by covering the cable core, which is formed by stacking the optical fiber ribbons, with the inner cover layer. However, the cable core is not necessarily formed by stacking the optical fiber ribbons; the cable core may also be formed by, for example, twisting a plurality of optical fibers together. In addition, the present invention may also be applied to a self-supporting cable having a cable core which is formed of a collective body of insulated wires for power supply, communication wires, control wires, or a composite of such collective bodies. In addition, in the example of a method for manufacturing a self-supporting cable of the present invention which is described above with reference to FIGS. 4A and 4B, the support member is disposed above the main cable when they pass through the crosshead. However, the positional relationship between the support member and the main cable may also be opposite, and the support member may be disposed below the main cable. In addition, the support member and the main cable may also be horizontally arranged. In such a case, however, the rollers must also be disposed such that the rotational axes thereof extend horizontally.

EXAMPLE

A cable core was formed by stacking four optical fiber ribbons, each of which included twelve optical fibers, and was covered by an inner cover layer formed of polyethylene. An inside diameter of the inner cover layer was 6 mm and an outside diameter thereof was 12 mm. Then, a main cable was constructed by embedding two strength members, each having a diameter of 1 mm, in the inner cover layer such that they were arranged on a plane which passed through the central axis of the inner cover layer. The distance between the strength members and the central axis of the main cable was 5 mm. Then, self-supporting cables were manufactured from the main cable and a support member, which was formed by stranding seven steel wires, each having a diameter of 2.0 mm, by using the manufacturing apparatus shown in FIGS. 4A and 4B.

A plurality of self-supporting cables were manufactured by using rollers of different diameters as the rollers 25 and 28, and the alignment accuracy of the support member and the main cable in the obtained self-supporting cables were determined. The results are shown in Table. The roller 25 was disposed 1 m of the crosshead 26, and thereby the moving direction of the main cable 24 was changed by 30°. In addition, the roller 28 was disposed 2 m downstream from the crosshead 26, and the self-supporting cable 27 was wound around the roller 28.

TABLE

| Sample number | Diameter of roller 25 (mm) | Diameter of roller 28 (mm) | Displacement d (mm) |
| --- | --- | --- | --- |
| 1 | 750 | 750 | 2.0 |
| 2 | 500 | 500 | 0.5 |
| 3 | 375 | 375 | 0.3 |
| 4 | 250 | 250 | 0.2 |
| 5 | 125 | 125 | 0.1 |
| 6 | 750 | — | 3.0 |
| 7 | 500 | — | 1.0 |
| 8 | 375 | — | 0.7 |
| 9 | 250 | — | 0.5 |
| 10 | 125 | — | 0.3 |

Figure 7:
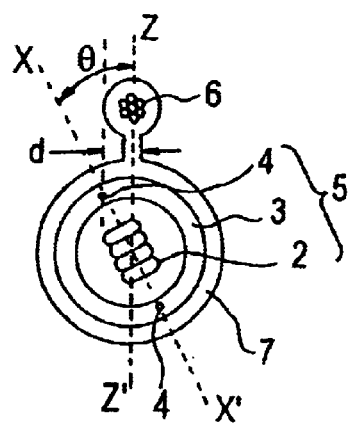
FIG. 7 is a sectional view which shows a state in which a support member and strength members are displaced relative to each other.

As shown in FIG. 7, in a self-supporting cable which is actually manufactured, the plane Z–Z' passing through the central axes of the support member 6 and the main cable 5 is often slightly tilted relative to the plane X–X' on which the strength members 4 are arranged. In such a case, the strength members 4 are displaced from the plane Z–Z' which passes through the central axes of the support member 6 and the main cable 5. Accordingly, with respect to the manufactured self-supporting cables, the displacement d between the strength members 4 and the plane Z–Z' was determined.

As described above, the distance between the central axis of the main cable 5 and the strength members 4 was 5 mm. Thus, it is understood from Table that when the radius of the roller 25 was one hundred times the distance or less, that is, 500 mm or less, the displacement d was reduced to 1.0 mm or less, even when the roller 28 was not provided. Furthermore, in the case in which the roller 28 was provided, the displacement d was reduced to 0.5 mm or less, and the alignment accuracy was increased. When the displacement d is 1.0 mm or less, an angle θ between the plane Z–Z', which passes through the central axes of the support member 6 and the main cable 5, and the plane X–X', on which the strength members 4 are arranged, is 12° or less. Thus, in such a case, the support member 6 and the strength members 4 are arranged substantially on the same plane, and no problem occurs when the self-supporting cable is wound around a drum.

The shapes of the self-supporting cables, which were manufactured by covering the support member and the main cable with the outer cover layer, were also observed. However, none of the samples shown in Table were deformed in such a manner that the outer cover layer and the inner cover layer were compressed. In addition, degradation of the transmission characteristics of the optical fibers contained in the cable core did not occur.

In addition, other self-supporting cables were manufactured using the rollers shown in FIGS. 6A and 6B in place of the roller 25. The main cable and the support member used for manufacturing the self-supporting cables were the same as those used in the above-described samples. The radius of the rollers was 125 mm, and the interval x between the centers of the rollers in the moving direction of the main cable was 200 mm, and the interval y between the centers of the rollers in the direction perpendicular to the moving direction of the main cable was 257 mm. The outside diameter of the main cable was 12 mm, therefore it was not possible to bend the main cable when the interval y was 125 mm×2+12 mm=262 mm. Accordingly, the size of the interval y was set to a value of 5 mm less than the above-described value, and the main cable was bent by the rollers in the alternately opposite direction. In this case, no roller was disposed in the rear of the crosshead. As a result, in the case in which the rollers were disposed as shown in FIG. 6A, the displacement d was 0.5 mm, and in the case in which the rollers were disposed as shown in FIG. 6B, the displacement d was 0.3 mm or less.

In the self-supporting cable according to the present invention, the outer cover layer has a complex structure such that the length of the support member portion and the length of the main cable portion are different and window portions are provided between the support member portion and the main cable portion.

However, since the main cable is first formed by covering the cable core with the inner cover layer and the outer cover layer having the figure-8 shaped is then formed so as to cover the support member and the main cable, the inner surface of the outer cover layer is prevented from being deformed and protruding inward. Accordingly, the cable core is not subject to local pressure, and degradation of the transmission characteristics of the optical fibers contained in the cable core does not occur.

In addition, according to the present invention, a method for manufacturing a self-supporting cable includes the steps of arranging a main cable, which includes strength members at positions apart from the central axis of the main cable, and a support member in parallel to each other; and forming an outer cover layer so as to cover the main cable and the support member in a crosshead of an extruder. The main cable is led to the crosshead of the extruder after being bent by a first roller which is disposed upstream of the crosshead, the first roller having a rotational axis which is parallel to a plane passing through the central axis of the support member and the central axis of the main cable in the crosshead of the extruder and is perpendicular to a moving direction of the main cable. Thus, by the time the support member and the main cable reach the cross head, the strength members in the main cable are arranged on the plane passing through the central axes of the support member and the main cable. Accordingly, the self-supporting cable in which the support member and the strength members are arranged on the same plane can be obtained. Such a self-supporting cable has high flexibility, and can be wound around a drum having a relatively small diameter.

When the diameter of the roller is 100 times the distance between the center of the main cable and the strength members or less, the displacement of the strength members from the plane including the central axes of the support member and the main cable can be made 1 mm or less. Accordingly, a self-supporting cable in which the support member and the strength members are substantially disposed on the same plane can be obtained more reliably.

What is claimed is:

1. A self-supporting cable comprising:

a main cable constructed by covering a cable core with an inner cover layer, which is formed of a thermoplastic resin and which has a tubular shape, and installing one or more strength members inside the thermoplastic resin of the inner cover layer such that the one or more strength members lie on a plane passing through the central axis of the inner cover layer;

a support member; and an outer cover layer which is formed of a thermoplastic resin and which has a figure-8 shape in cross-section, and which is formed so as to cover the main cable and the support member while the main cable and the support member are arranged in parallel to each other, wherein a support member portion, which includes the support member and a part of the outer cover layer around the support member, and a main cable portion, which includes the main cable and a part of the outer cover layer around the main cable, are connected to each other with connecting portions, which are also a part of the outer cover layer, with intervals in the longitudinal direction, and wherein the main cable portion is made longer than the support member portion so that there is an allowance in the length thereof.

2. A self-supporting cable according to claim 1, wherein the Young's modulus of the thermoplastic resin of the inner cover layer is higher than the Young's modulus of the thermoplastic resin of the outer cover layer.

3. The self-supporting cable according to claim 2, wherein the one or more strength members are completely within the thermoplastic resin of the inner cover layer.

4. A self-supporting cable according to claim 1, wherein all of the one or more strength members are disposed on a plane which passes through the central axis of the support member and the central axis of the main cable.

5. A self-supporting cable according to claim 4, wherein the Young's modulus of the thermoplastic resin of the inner cover layer is higher than the Young's modulus of the thermoplastic resin of the outer cover layer.

6. The self-supporting cable according to claim 5, wherein the one or more strength members are completely within the thermoplastic resin of the inner cover layer.

7. The self-supporting cable according to claim 4, wherein the one or more strength members are completely within the thermoplastic resin of the inner cover layer.

8. The self-supporting cable according to claim 1, wherein the one or more strength members are completely within the thermoplastic resin of the inner cover layer.

* * * * *